United States Patent
Osada

(10) Patent No.: US 8,998,712 B2
(45) Date of Patent: *Apr. 7, 2015

(54) GAME SYSTEM, GAME APPARATUS, NON-TRANSITORY COMPUTER-READABLE STORAGE MEDIUM HAVING GAME PROGRAM STORED THEREON, AND GAME PROCESSING CONTROL METHOD

(71) Applicant: Nintendo Co., Ltd., Kyoto (JP)

(72) Inventor: Junya Osada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 138 days.

This patent is subject to a terminal disclaimer.

(21) Appl. No.: 13/867,559

(22) Filed: Apr. 22, 2013

(65) Prior Publication Data

US 2014/0113717 A1    Apr. 24, 2014

(30) Foreign Application Priority Data

Oct. 18, 2012 (JP) ................................ 2012-231011

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/40 | (2014.01) |
| G10H 7/00 | (2006.01) |
| A63F 13/26 | (2014.01) |
| A63F 13/45 | (2014.01) |
| A63F 13/54 | (2014.01) |
| H04R 3/12 | (2006.01) |

(52) U.S. Cl.
CPC *A63F 13/10* (2013.01); *G10H 7/00* (2013.01); *A63F 13/26* (2014.09); *A63F 13/45* (2014.09); *A63F 13/54* (2014.09); *H04R 3/12* (2013.01)

(58) Field of Classification Search
USPC ........................................................... 463/31
See application file for complete search history.

(56) References Cited

U.S. PATENT DOCUMENTS

| | | |
|---|---|---|
| 4,398,189 A | 8/1983 | Pasierb et al. |
| 4,580,134 A | 4/1986 | Campbell et al. |
| 6,011,590 A | 1/2000 | Saukkonen |
| 6,273,821 B1 | 8/2001 | Moriguchi |
| 6,416,410 B1 | 7/2002 | Abou-Samra et al. |
| 7,115,031 B2 | 10/2006 | Miyamoto et al. |
| 7,126,584 B1 | 10/2006 | Nishiumi et al. |
| 7,338,376 B2 | 3/2008 | Eck et al. |
| 7,671,916 B2 | 3/2010 | Hashimoto |
| 8,246,460 B2 | 8/2012 | Kitahara |
| 2004/0176170 A1 | 9/2004 | Eck et al. |

(Continued)

FOREIGN PATENT DOCUMENTS

| | | |
|---|---|---|
| JP | 2009-297221 | 12/2009 |
| JP | 2012-135337 | 7/2012 |

*Primary Examiner* — Kevin Y Kim

(74) *Attorney, Agent, or Firm* — Nixon & Vanderhye PC

(57) ABSTRACT

A game system includes a game apparatus, a first output device having a first display section and a first sound output section, and a second output device having a second display section and a second sound output section. In this system, a first sound signal to be output to the first sound output section and a second sound signal to be output to the second sound output section are generated based on the same sound data. When transmitting the two sound signals, the timing to transmit the first sound signal to the first sound section is delayed by a predetermined time with respect to the timing to transmit the second sound signal to the second audio section.

9 Claims, 9 Drawing Sheets

(56) References Cited

U.S. PATENT DOCUMENTS

| | | |
|---|---|---|
| 2009/0312106 A1 | 12/2009 | Okamura et al. |
| 2010/0167816 A1 | 7/2010 | Perlman et al. |
| 2010/0253592 A1 | 10/2010 | Slobodin et al. |
| 2011/0190052 A1 | 8/2011 | Takeda et al. |
| 2011/0190061 A1 | 8/2011 | Takeda et al. |
| 2012/0088580 A1 | 4/2012 | Takeda et al. |
| 2012/0165095 A1 | 6/2012 | Sato et al. |

F I G. 1
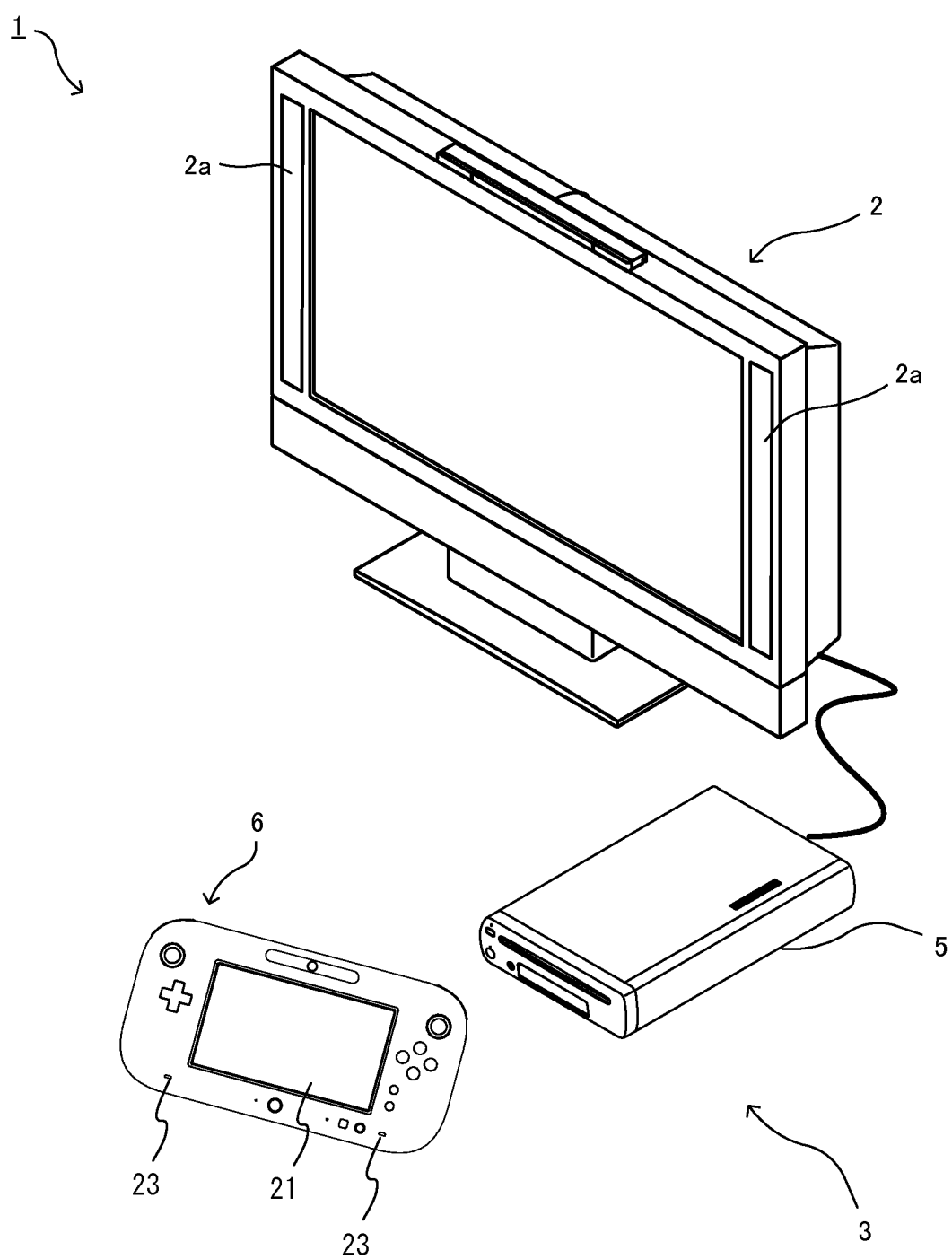

F I G. 2
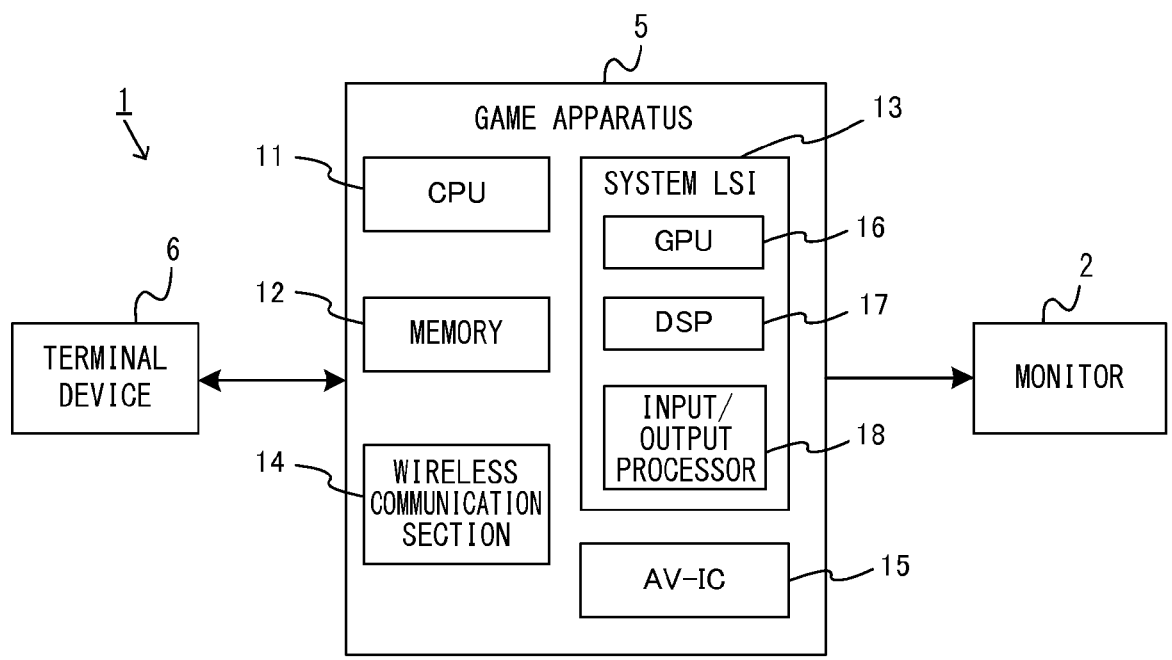

F I G. 4
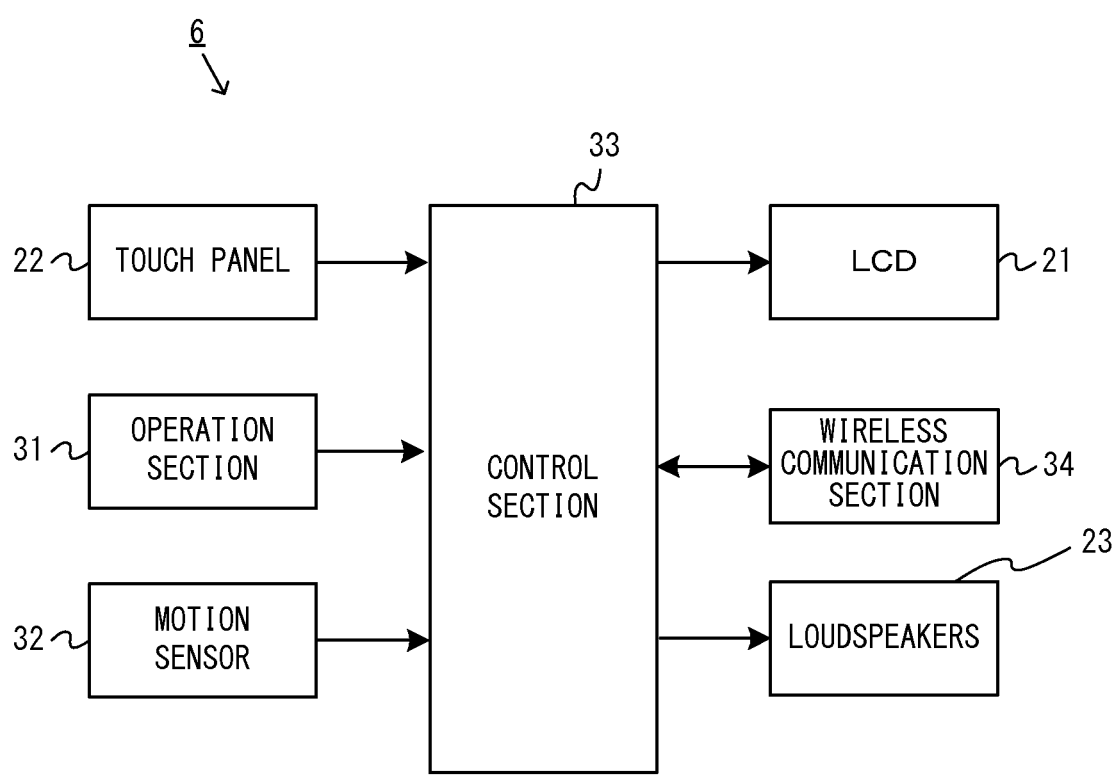

F I G. 5
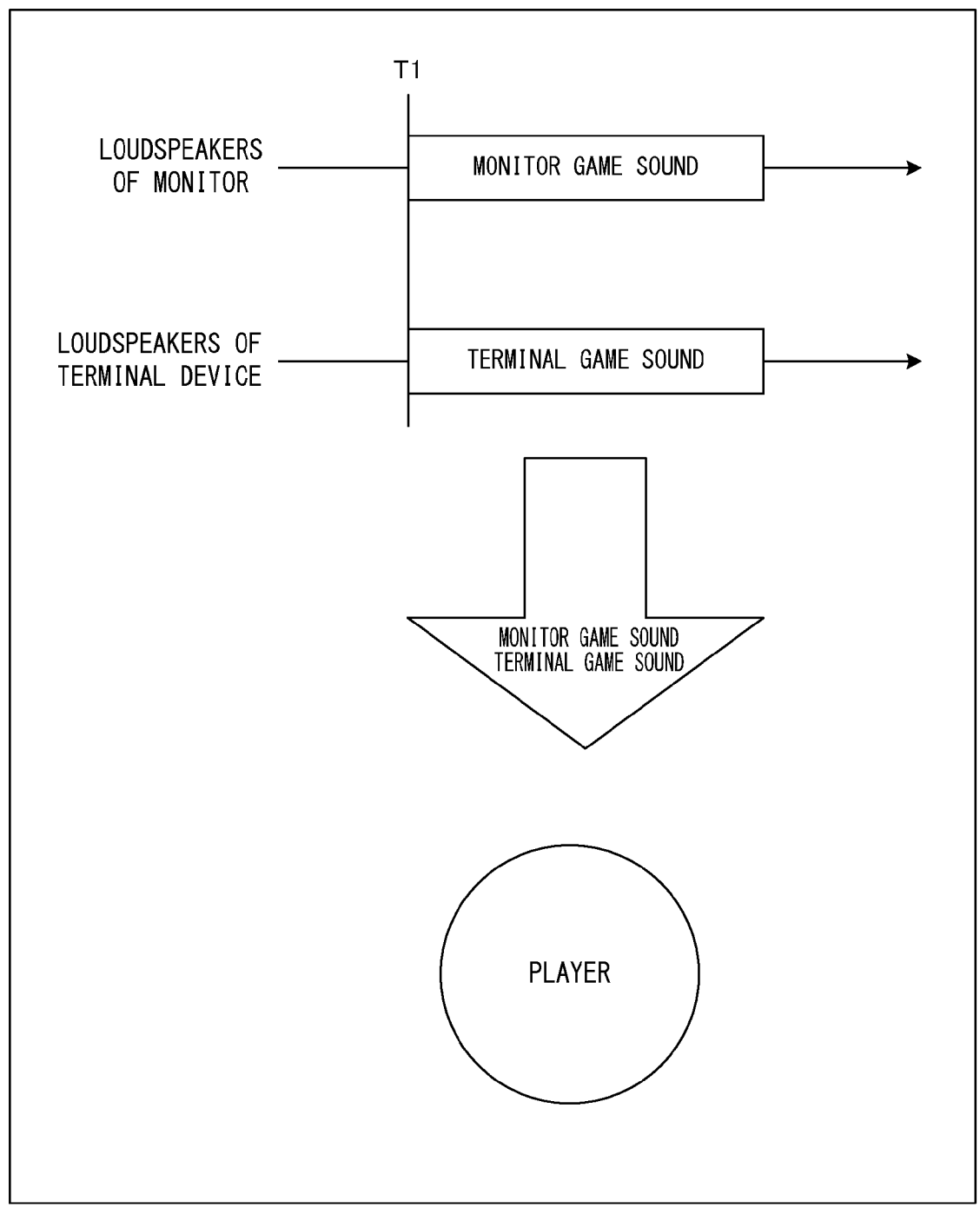

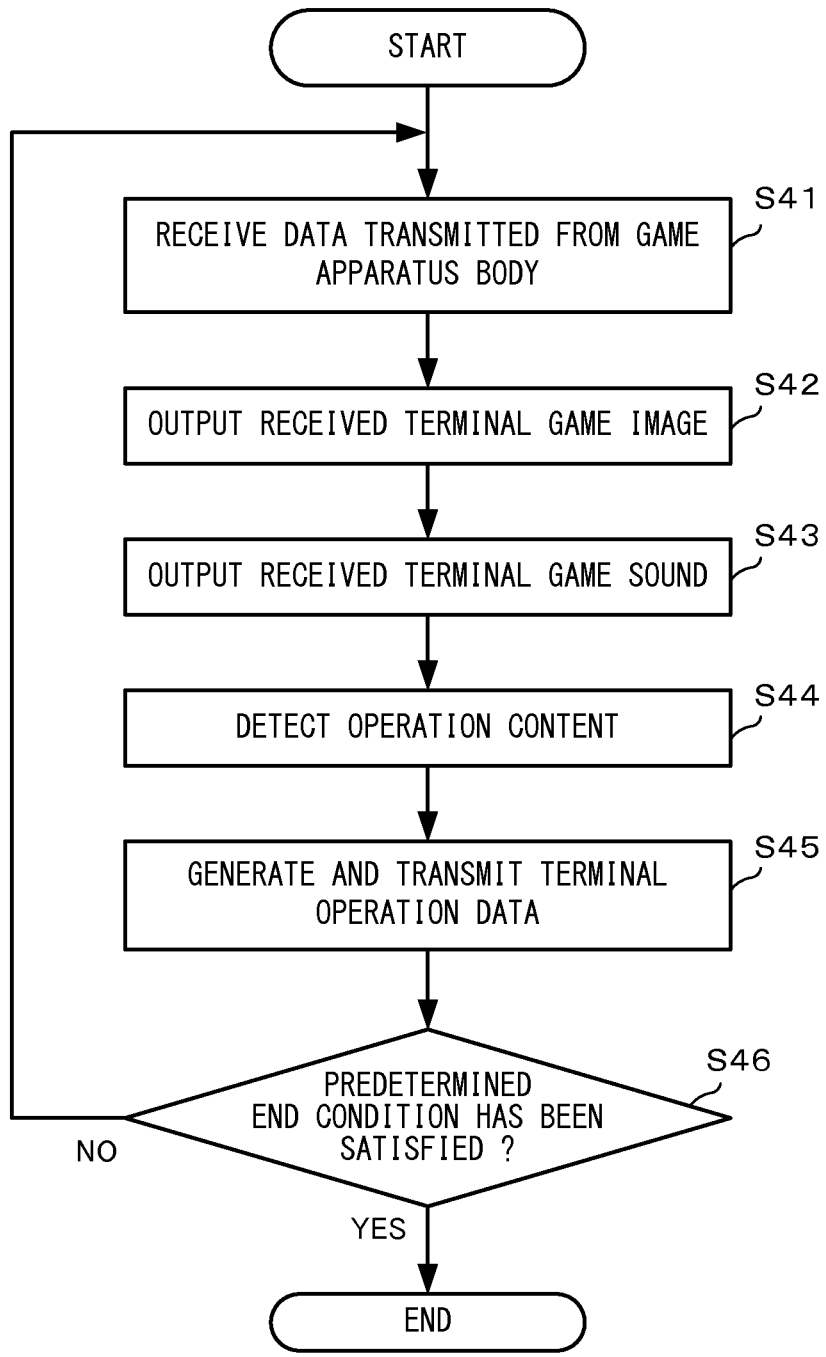

(1)

GAME SYSTEM, GAME APPARATUS, NON-TRANSITORY COMPUTER-READABLE STORAGE MEDIUM HAVING GAME PROGRAM STORED THEREON, AND GAME PROCESSING CONTROL METHOD

CROSS REFERENCE TO RELATED APPLICATION

The disclosure of Japanese Patent Application No. 2012-231011, filed on Oct. 18, 2012, is incorporated herein by reference.

FIELD

The exemplary embodiments relate to a game system, a game apparatus, a non-transitory computer-readable storage medium having a game program stored thereon, and a game processing control method, and more particularly, to those using a plurality of different sound output devices.

BACKGROUND AND SUMMARY

Conventionally, a game system has been known in which a general television device (first video output device) and a controller (second video output device) including a display section capable of video output, which is different from the first video output device, are used in combination. In such a game system, for example, a first game video is displayed on the television device, and a second game video different from the first game video is displayed on the display section of the controller, thereby proposing a new game.

However, the above-mentioned proposal has focused mainly on what kinds of videos are to be displayed and how to display the videos in relation to game processing. Therefore, processing relating to audio has been neither mentioned nor proposed in particular.

Therefore, an object of the exemplary embodiments is to provide a game system, a game apparatus, a non-transitory computer-readable storage medium having a game program stored thereon, and a game processing control method, which are capable of providing a player with a new game using sound output devices that are physically different from each other. It is noted that examples of the computer-readable storage medium include magnetic media such as a flash memory, a ROM, and a RAM, and optical media such as a CD-ROM, a DVD-ROM, and a DVD-RAM.

The above object is achieved by the following configurations, for example.

An exemplary configuration is a game system including a game apparatus, a first output device having a first display section and a first sound output section, and a second output device having a second display section and a second sound output section. The game apparatus includes an image generation section, a sound generation section, and a sound signal transmission section. The image generation section generates a first image to be displayed on the first display section, and a second image to be displayed on the second display section. The sound generation section generates, based on the same sound data, a first sound signal to be output to the first sound output section, and a second sound signal to be output to the second sound output section. The sound signal transmission section transmits the first sound signal to the first sound output section, and transmit the second sound signal to the second sound output section. The sound signal transmission section transmits the first sound signal such that a timing to transmit the first sound signal to the first sound section is delayed by a predetermined time with respect to a timing to transmit the second sound signal to the second audio section.

According to the exemplary configuration, for example, under the situation where a player needs to gaze at the second output device, the player's line of sight is prevented from being guided to the first output device, and thus the state where the player gazes at the second output device can be maintained.

In another exemplary configuration, the first output device may be a monitor device which includes or is connectable to predetermined loudspeakers as the first sound section. In addition, the second output device may include a housing which is small enough to be held by a player. The second sound output section may be integrated with the housing.

In another exemplary configuration, the sound signal transmission section may transmit the first sound signal such that the transmission timing of the first sound signal is delayed with respect to the transmission timing of the second sound signal, so that a player can recognize that the same sound based on the same sound data is output from each of the first sound output section and the second sound output section, and the player can comprehend the content of the output sound.

In another exemplary configuration, the sound signal transmission section may transmit the first sound signal to the first sound output section such that the transmission timing of the first sound signal is delayed by a value in a range from 20 ms to 100 ms with respect to the transmission timing of the second sound signal.

In still another exemplary configuration, the image generation section may generate, as the first image, an image of a virtual space based on a first virtual camera, and generate, as the second image, an image of the virtual space based on a second virtual camera.

In still another exemplary configuration, the second output device may further include an operation data generation section configured to generate operation data based on an operation performed by a player. In addition, the game apparatus may further include a game processing section configured to perform a game process based on the operation data.

According to the exemplary embodiments, when the attention of a player needs to be kept on the second output device, the player's line of sight is prevented from being guided to the first output device, and thus the state where the attention of the player is kept on the second output device can be maintained.

BRIEF DESCRIPTION OF THE DRAWINGS

FIG. 1 is an external view showing a non-limiting example of a game system 1 according to an exemplary embodiment;

FIG. 2 is a functional block diagram showing a non-limiting example of a game apparatus body 5 in FIG. 1;

FIG. 4 is a block diagram showing a non-limiting example of an internal structure of the terminal device 6;

FIG. 5 is a schematic diagram showing a non-limiting example of an output state of a game sound;

FIG. 10 is a flowchart showing a flow of control processing of the terminal device 6.

DETAILED DESCRIPTION OF NON-LIMITING EXAMPLE EMBODIMENTS

Figure 3:
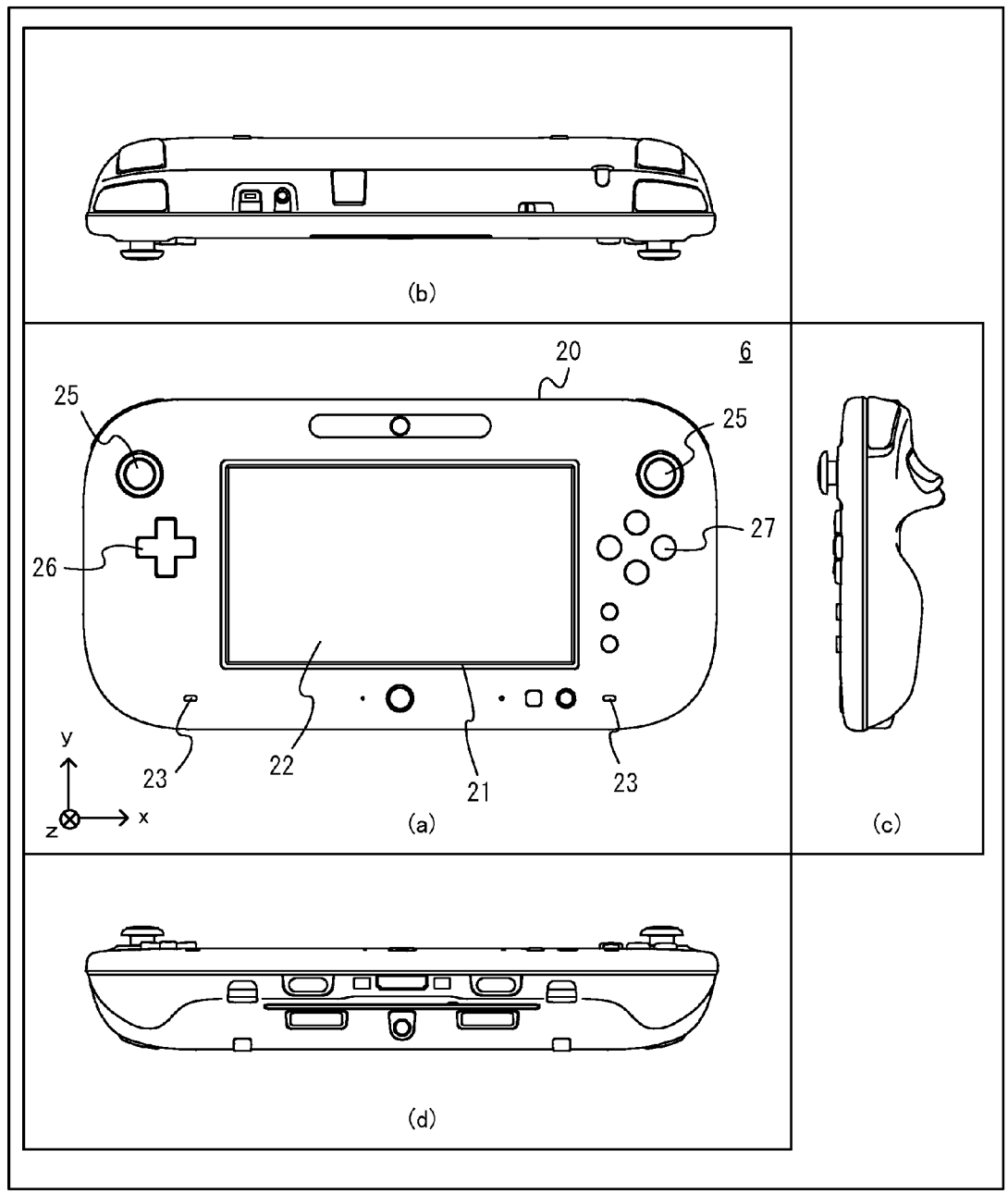
FIG. 3 is a diagram showing a non-limiting example of an external structure of a terminal device 6 in FIG. 1.

With reference to FIG. 1, a game system according to an exemplary embodiment will be described.

As shown in FIG. 1, a game system 1 includes a household television receiver (hereinafter, referred to as a monitor) 2 that is an example of display means, and a stationary game apparatus 3 connected to the monitor 2 via a connection cord. The monitor 2 includes loudspeakers 2a. The game apparatus 3 includes a game apparatus body 5, and a terminal device 6.

The monitor 2 displays a game image outputted from the game apparatus body 5. The monitor 2 includes the loudspeakers 2a, and the loudspeakers 2a each output a game sound outputted from the game apparatus body 5. In this exemplary embodiment, the monitor 2 includes the loudspeakers 2a. In another exemplary embodiment, external loudspeakers may be additionally connected to the monitor 2 (via an amplifier or the like).

The game apparatus body 5 executes game processing and the like based on a game program or the like stored in an optical disc that is readable by the game apparatus body 5.

The terminal device 6 is an input device that is small enough to be held by a user. The user is allowed to move the terminal device 6 with hands, or place the terminal device 6 at any location. The terminal device 6 includes an LCD (Liquid Crystal Display) 21 as display means, loudspeakers 23, a headphone jack described later, input means (analog sticks, press-type buttons, a touch panel, and the like), and the like. The terminal device 6 and the game apparatus body 5 are communicable with each other wirelessly (or via a cable). The terminal device 6 receives, from the game apparatus body 5, data of an image (e.g., a game image) generated in the game apparatus body 5, and displays the image represented by the data on the LCD 21. Further, the terminal device 6 receives, from the game apparatus body 5, data of a sound (e.g., a sound effect, BGM or the like of a game) generated in the game apparatus body 5, and outputs the sound represented by the data from the loudspeakers 23. Further, the terminal device 6 transmits, to the game apparatus body 5, operation data representing the content of an operation performed on the terminal device 6.

FIG. 2 is a block diagram showing the game apparatus body 5. In FIG. 2, the game apparatus body 5 is an example of an information processing apparatus. In the exemplary embodiment, the game apparatus body 5 includes a CPU (control section) 11, a memory 12, a system LSI 13, a wireless communication section 14, and an AV-IC (Audio Video-Integrated Circuit) 15, and the like.

The CPU 11 executes a predetermined information processing program by using the memory 12, the system LSI 13, and the like. Thereby, various functions (e.g., game processing) in the game apparatus 3 are realized.

The system LSI 13 includes a GPU (Graphics Processor Unit) 16, a DSP (Digital Signal Processor) 17, an input/output processor 18, and the like.

The GPU 16 generates an image in accordance with a graphics command (draw command) from the CPU 11. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image", and the game image to be displayed on the terminal device 6 may be referred to as a "terminal game image".

The DSP 17 serves as an audio processor, and generates sound data by using sound data and sound waveform (tone quality) data stored in the memory 12. In the exemplary embodiment, similarly to the game images, both a game sound to be output from the loudspeakers 2a of the monitor 2 and a game sound to be output from the loudspeakers 23 of the terminal device 6 may be generated. Hereinafter, the game sound to be output from the monitor 2 may be referred to as a "monitor game sound", and the game sound to be output from the terminal device 6 may be referred to as a "terminal game sound".

The input/output processor 18 executes transmission and reception of data with the terminal device 6 via the wireless communication section 14. In the exemplary embodiment, the input/output processor 18 transmits data of the game image (terminal game image) generated by the GPU 16 and data of the game sound (terminal game sound) generated by the DSP 17, via the wireless communication section 14 to the terminal device 6. At this time, the terminal game image may be compressed and transmitted so as to avoid a delay in the display image. In addition, the input/output processor 18 receives, via the wireless communication section 14, operation data and the like transmitted from the terminal device 6, and (temporarily) stores the data in a buffer region of the memory 12.

Of the images and sounds generated in the game apparatus body 5, the image data and sound data to be output to the monitor 2 are read by the AV-IC 15. Through an AV connector that is not shown, the AV-IC 15 outputs the read image data to the monitor 2, and outputs the read sound data to the loudspeakers 2a included in the monitor 2. Thereby, an image is displayed on the monitor 2, and a sound is output from the loudspeakers 2a.

FIG. 3 is a diagram showing an example of an external structure of the terminal device 6. As shown in FIG. 3, the terminal device 6 includes a substantially plate-shaped housing 20. The size (shape) of the housing 20 is small enough to be held by a user with both hands or one hand. Further, the terminal device 6 includes an LCD 21 as an example of a display section. The above-mentioned terminal game image is displayed on the LCD 21.

The terminal device 6 includes the loudspeakers 23. The above-mentioned terminal game sound is output from the loudspeakers 23.

The terminal device 6 includes a touch panel 22. The touch panel 22 is an example of a position detection section for detecting a position of an input performed on a predetermined input surface (a screen of the display section) provided on the housing 20. Further, the terminal device 6 includes, as an operation section (an operation section 31 shown in FIG. 4), analog sticks 25, a cross key 26, buttons 27, and the like.

FIG. 4 is a block diagram showing an electrical configuration of the terminal device 6. As shown in FIG. 4, the terminal device 6 includes the above-mentioned LCD 21, touch panel 22, loudspeakers 23, and operation section 31. Further, the terminal device 6 includes a motion sensor 32 (e.g., an acceleration sensor or a gyro sensor) for detecting the attitude of the terminal device 6.

The terminal device 6 includes a wireless communication section 34 capable of wirelessly communicating with the game apparatus body 5. In the exemplary embodiment, wireless communication is performed between the terminal device 6 and the game apparatus body 5. In another exemplary embodiment, wired communication may be performed.

The terminal device 6 includes a control section 33 for controlling operations in the terminal device 6. Specifically, the control section 33 receives output data from the respective input sections (the touch panel 22, the operation section 31, and the motion sensor 32), and transmits the received data, as operation data, via the wireless communication section 34 to the game apparatus body 5. When the terminal game image from the game apparatus body 5 is received by the wireless communication section 34, the control section 33 performs, according to need, appropriate processes (e.g., decompression if the image data is compressed), and causes the LCD 21 to display the image from the game apparatus body 5. Further, when the terminal game sound from the game apparatus body 5 is received by the wireless communication section 34, the control section 33 outputs the terminal game sound to the loudspeakers 23.

Figure 6:
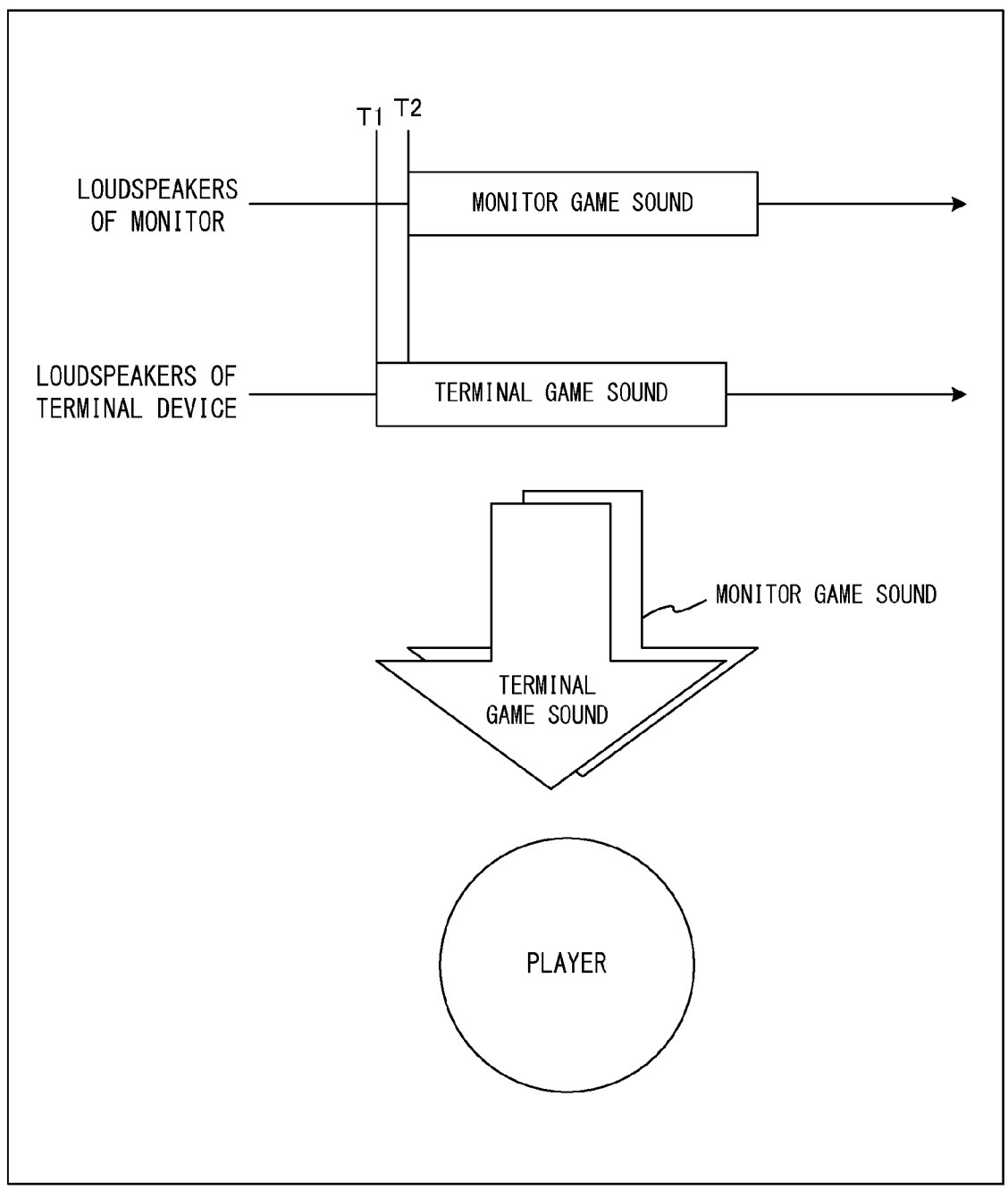
FIG. 6 is a schematic diagram showing a non-limiting example of an output state of a game sound according to the exemplary embodiment.

Next, an overview of processing executed in the system of the exemplary embodiment will be described with reference to FIGS. 5 and 6.

In the exemplary embodiment, a game processing as follows is assumed as an example of information processing. A game realized by the game processing can be played by multiple people. For example, the game is a party game in which mini games, each allowing four people to play at the same time, are collected. When playing the game, only one player among the four players uses the terminal device 6 as a controller. The remaining three players play the game by using controllers (not shown) other than the terminal device 6. Each of the other controllers includes operation buttons but does not include a screen (LCD) and a touch panel 22 which are included in the terminal device 6.

In the above-mentioned game, for example, a situation is assumed in which, in advance of starting to play a predetermined mini game, an explanation about the rule, operation method, and the like of the mini game is presented to the players. In the exemplary embodiment, this explanation is presented by a display of characters on the screen and a voice sound reading the characters. In particular, a game is assumed in which the role and operation method of the player using the terminal device 6 are different from those of the other three players. For example, the player using the terminal device 6 runs and hides in a virtual space, and the other three players chase after the player to catch him/her. In this case, the player using the terminal device 6 plays the game while mainly viewing the LCD 21 of the terminal device 6, and the other three players play the game while viewing the screen of the monitor 2.

In the exemplary embodiment, when explaining the above-mentioned mini game, for example, the same explanation about the rule of the game is presented to all the players. On the other hand, regarding the specific operation method, the content of explanation presented to the player using the terminal device 6 is different from the content of explanation presented to the other three players. The explanation content common to all the players is displayed as characters on the screen of the monitor 2, and simultaneously, output as a voice sound (monitor game voice) from the loudspeakers 2a. Further, the same explanation is displayed on the LCD 21 of the terminal device 6, and the same voice sound (terminal game voice) is output from the loudspeakers 23. The explanation content presented to only the player using the terminal device 6 is output from only the LCD 21 and the loudspeakers 23. The explanation content presented to the other three players is output from the screen of the monitor 2 and the loudspeakers 2a. In other words, the player using the terminal device 6 can grasp the rule, the operation method and the like of the mini game as long as he/she is watching the LCD 21 (that is, the player need not watch the monitor 2).

The common explanation content is output from both the loudspeakers 2a of the monitor 2 and the loudspeakers 23 of the terminal device 6. At this time, if the output timings of the voice sound from the respective loudspeakers are completely the same, it is difficult for the player using the terminal device 6 to recognize the loudspeakers from which the voice sound is output. FIG. 5 schematically shows such a situation. At timing T1, output of the voice sound for the common explanation content is started simultaneously from the respective loudspeakers. Then, the voice sounds from the respective loudspeakers are mixed, and the player hears the mixed sound. As the result, the player recognizes that the voice sound is output from only the loudspeakers 2a of the monitor 2, and thereby the line of sight of the player who has gazed at the LCD 21 might move to the monitor 2. That is, in spite of the situation where the player needs to gaze at the LCD 21, outputting the same voice sound from the different loudspeakers at the same time might cause the player's line of sight to be guided to the monitor 2 (since the monitor 2 is usually larger than the LCD 21 of the terminal device 6, the player's eyes are inevitably drawn to the monitor 2). As the result, for example, when the information to be displayed on or output from only the LCD 21, such as the operation method specific to the terminal device 6, is displayed on or output from the LCD 21, the player might fail to see or hear the information.

Therefore, in the exemplary embodiment, when outputting the voice sound from both the loudspeakers 2a of the monitor 2 and the loudspeakers 23 of the terminal device 6 as mentioned above, a process of intentionally delaying the voice sound on the monitor side a little is performed. FIG. 6 schematically shows this process. In FIG. 6, output of the terminal game sound is started at timing T1, and output of the monitor game sound is started at timing T2. In this way, at the timing when the player would have recognized the content of the voice sound outputted from the loudspeakers 23 of the terminal device 6, the same voice sound is output from the loudspeakers 2a of the monitor 2. Thereby, it is possible to cause the player to recognize that the voice sound of the same content is output from the respective loudspeakers. As the result, the above-mentioned line-of-sight guidance to the monitor 2 is prevented, and thus it is possible to maintain the state where the line of sight of the player using the terminal device 6 is kept on the LCD 21.

By the way, in the exemplary embodiment, the process of intentionally delaying the sound output on the monitor side is performed as described above. However, if this delay is excessively long, the player might be nervous about the sound gap, and it might be difficult for the player to hear the voice sound. Therefore, the delay needs to be so short that it is not difficult for the player to hear the voice sound, and that the player can momentarily recognize that the same voice sound is output from the terminal device 6 and the monitor 2.

The result of an experiment is as follows. Assuming that the rendering time per frame is 1/60 sec (about 16.66 ms) (the description below is also based on this assumption), when the delay was within a range from 20 ms to 100 ms, it was not difficult for a player to hear the voice sound, and the player recognized that the same voice sound was separately output from the respective loudspeakers. It is noted that a delay width based on the performance of the monitor 2 is also taken into consideration. Depending on the video/audio processing performance of the monitor 2, there may be a case where the voice sound is originally output with some delay even if the intentional delay process is not performed. Generally, this delay is equivalent to about 2 to 4 frames in many cases.

Therefore, the experiment was conducted taking into consideration the original delay due to the performance of the monitor, and satisfactory results were obtained when the delay was within a range from 20 ms to 100 ms. If the delay exceeds the upper limit of this range, the voice sound from the monitor 2 is excessively delayed because of the original delay due to the monitor performance being added. For example, when the voice sound was delayed by 1 sec, the player could not easily hear the sound. Conversely, if the delay goes below the lower limit of this range, the player could not recognize that the same voice sound was separately output from the respective loudspeakers.

In the exemplary embodiment, as an example of a particularly desirable range of the above-mentioned delay, a case will be described where the sound output on the monitor 2 side is delayed by 1/15 sec (equivalent to 4 frames, about 66.66 ms) when the rendering time per frame is 1/60 sec.

Next, an operation of the system 1 to realize the above-mentioned game processing will be described in detail with reference to FIGS. 7 to 10.

Figure 7:
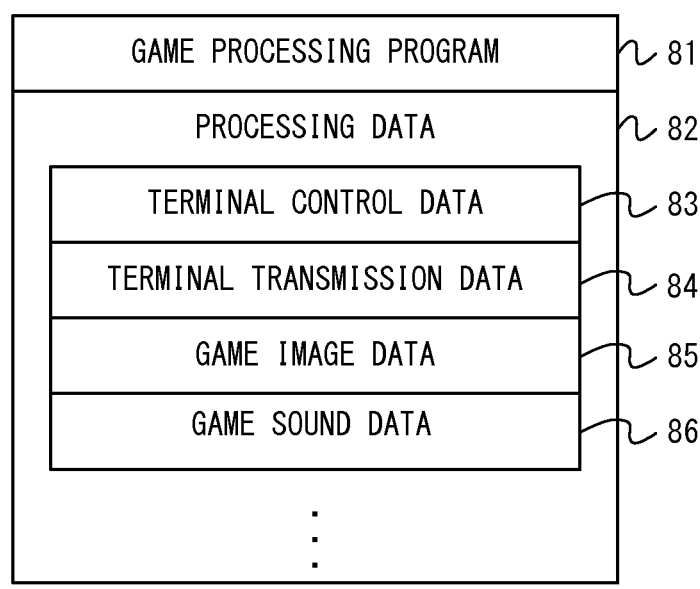
FIG. 7 is a memory map of a memory 12.

FIG. 7 shows an example of various data stored in the memory 12 of the game apparatus body 5 when executing the above-mentioned game processing.

A game processing program 81 is a program for causing the CPU 11 of the game apparatus body 5 to execute the game processing to realize the above-mentioned game. For example, the game processing program 81 is loaded from an optical disc to the memory 12.

Processing data 82 is data used for the game processing executed by the CPU 11. The processing data 82 includes terminal operation data 83, terminal transmission data 84, game image data 85, game sound data 86, and the like.

Figure 8:
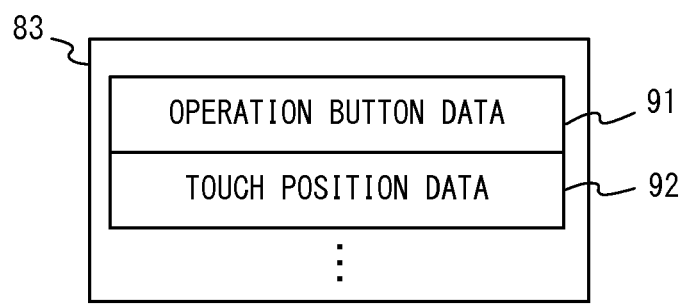
FIG. 8 is a non-limiting example of a structure of terminal operation data 83.

The terminal operation data 83 is operation data periodically transmitted from the terminal device 6. FIG. 8 is a diagram showing an example of a structure of the terminal operation data 83. The terminal operation data 83 includes operation button data 91, touch position data 92, and the like. The operation button data 91 is data representing an input state to the operation section 31 (the analog sticks 25, the cross key 26, and the buttons 27). In addition, the operation button data 91 also includes the content of an input to the motion sensor 32. The touch position data 92 is data representing a position (touch position) where an input is performed on the input surface of the touch panel 22.

The terminal transmission data 84 is data periodically transmitted to the terminal device 6. The terminal transmission data 84 includes the above-mentioned terminal game image and terminal game sound.

The game image data 85 is data which is an origin of the terminal game image and the monitor game image. For example, the game image data 85 includes data of various 3D objects that appear in the virtual game space, and the like.

The game sound data 86 is data which is an origin of the terminal game sound and the monitor game sound. The game sound data 86 includes the above-mentioned voice sound for explaining the mini games, and the like.

Figure 9:
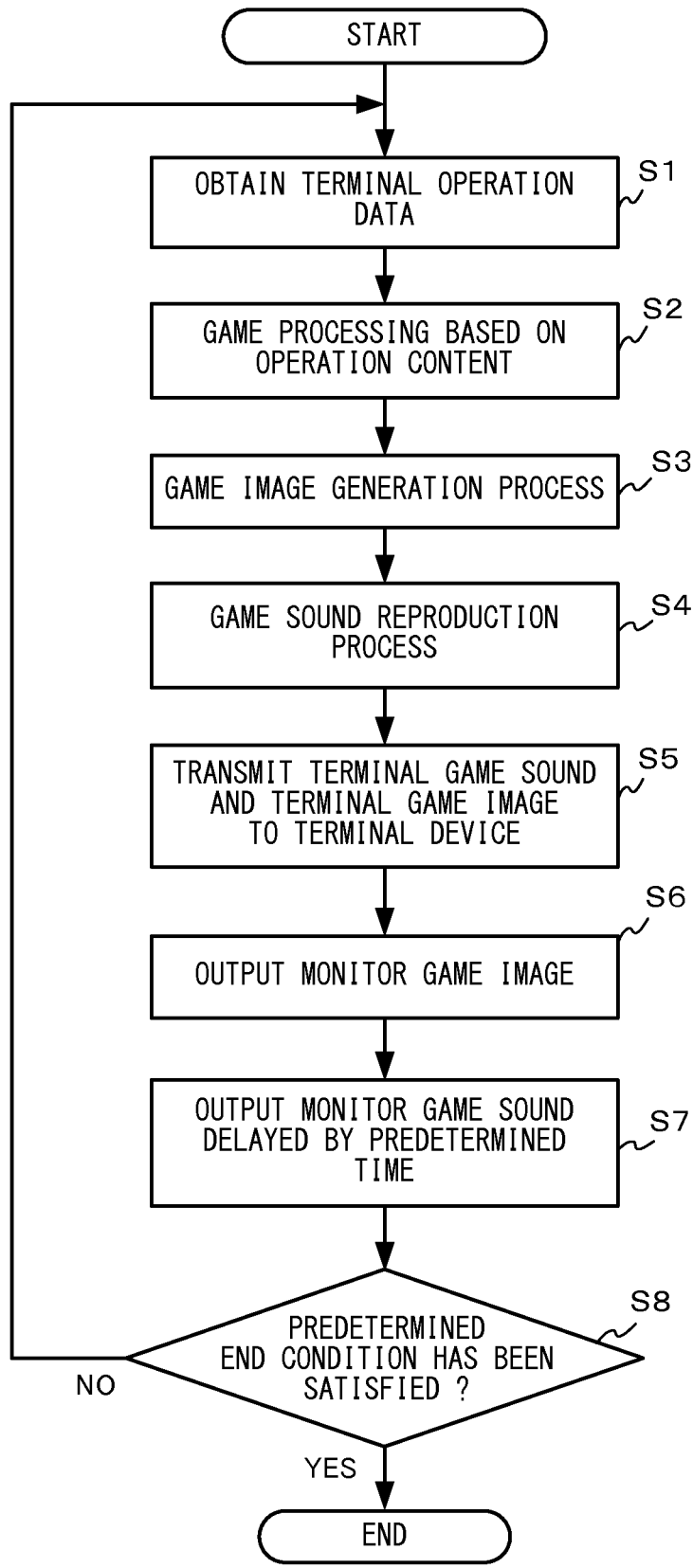
FIG. 9 is a flowchart showing a flow of game processing based on game processing program 81.

Next, an exemplary flow of the game processing performed by the CPU 11 of the game apparatus body 5 based on the game processing program 81 will be described with reference to the flowchart of FIG. 9.

When execution of the game processing program 81 is started, a predetermined initialization process is performed. Thereafter, the CPU 11 obtains the terminal operation data 83 in step S1 in FIG. 9.

Next, in step S2, the CPU 11 executes predetermined game processes based on the operation content represented by the terminal operation data 83 (mainly, the operation content represented by the operation button data 91 and/or the touch position data 92). For example, the CPU 11 executes a process of moving various characters and objects such as a player character, a hitting determination process, a score addition process, and the like.

Next, in step S3, the CPU 11 executes a process of generating a game image in which the results of the above-mentioned game processes are reflected. For example, a game image is generated by taking, using a virtual camera, the virtual game space in which the user character has been moved based on the operation content. At this time, the CPU 11 appropriately generates both a monitor game image and a terminal game image in accordance with the game content. Specifically, the two images are generated by using two virtual cameras, respectively.

Next, in step S4, the CPU 11 executes a process of reproducing a game sound. That is, the CPU 11 appropriately reads the game sound data 86 from the memory 12 in accordance with the content of the game processing (game progression or the like), and reproduces the data. For example, the above-mentioned voice sound explaining the game content common to the respective layers is reproduced.

Next, in step S5, data representing the reproduced voice sound is stored in the terminal transmission data 84 as the terminal game sound. Further, the terminal game image generated in step S3 is also stored in the terminal transmission data 84. Then, the CPU 11 transmits the terminal transmission data 84 to the terminal device 6. As the result, the terminal game sound as the original sound is transmitted to the terminal device 6, and (the sound signal representing) the voice sound is output from the loudspeakers 23 of the terminal device 6. In the exemplary embodiment, it is premised that there is substantially no delay (latency) of the sound output caused by the performance of the terminal device 6 itself. The reason is as follows. The terminal device 6 has been manufactured as a terminal device for the game apparatus 3, and therefore, the performance thereof has been tuned so as to avoid such a delay.

Next, in step S6, the CPU 11 outputs the monitor game image generated in step S3 to the monitor 2.

Next, in step S7, the CPU 11 performs output of the monitor game sound to the monitor 2 at a timing delayed by a predetermined time from the transmission of the terminal game sound. In the exemplary embodiment, output of the monitor game sound is delayed by 1/15 sec from the transmission of the terminal game sound. Any process may be adopted as long as the monitor game sound can be intentionally delayed. For example, in step S7, the monitor game sound may be output after performing a wait of 1/15 sec. Alternatively, assuming that the process loop shown in FIG. 9 is repeated with a period of 1/60 sec, for example, the voice sound reproduced in step S4 may be stored in a buffer, and in step 7, the voice sound having been reproduced in step S4 at a timing 4 frames prior to the current frame may be transmitted to the monitor 2. That is, in step S7, the voice sound at a frame 4 frames prior to the current frame may be constantly output as the monitor game sound.

In the exemplary embodiment, only the monitor game sound is delayed without delaying the monitor game image. However, in another exemplary embodiment, the monitor game image may also be output with a delay equivalent to 4 frames. That is, the monitor game sound and the monitor game image may be simultaneously output. In other words, the output timing of the game image and sound to the monitor 2 may be delayed by 4 frames with respect to the output timing of the game image and sound to the terminal device 6.

Next, in step S8, the CPU 11 determines whether or not a predetermined condition to end the game processing has been satisfied. Upon determining that the condition has not been satisfied (NO in step S8), the CPU 11 returns to step S1 to repeat the above-mentioned process steps. Upon determining that the condition has been satisfied (YES in step S8), the CPU 11 ends the game processing.

Next, an exemplary flow of a control process performed by the control section 33 of the terminal device 6 will be described with reference to the flowchart of FIG. 10. First, in step S41, the control section 33 receives the terminal transmission data 84 transmitted from the game apparatus body 5.

Next, in step S42, the control section 33 outputs, to the LCD 21, a terminal game image included in the received terminal transmission data 84.

Next, in step S43, the control section 33 outputs, to the loudspeakers 23, a sound signal based on data of the terminal game sound included in the received terminal transmission data 84.

Next, in step S44, the control section 33 detects inputs (operation contents) to the operation section 31, the motion sensor 32, and the touch panel 22, and generates operation button data 91 and touch position data 92.

Next, in step S45, the control section 33 generates terminal operation data 83 including the operation button data 91 and the touch position data 92 which have been generated in step S44, and transmits the terminal operation data 83 to the game apparatus body 5.

Next, in step S46, the control section 33 determines whether or not a predetermined condition to end the control process of the terminal device 6 has been satisfied (e.g., whether or not a power-off operation has been performed). Upon determining that the condition has not been satisfied (NO in step S46), the control section 33 returns to step S41 to repeat the above-mentioned process steps. Upon determining that the condition has been satisfied (YES in step S46), the control section 33 ends the control process of the terminal device 6.

As described above, according to the exemplary embodiment, when the loudspeakers of the terminal device 6 and the loudspeakers of the monitor 2 output the same game sound, the output of the game sound on the monitor side is intentionally delayed a little with respect to the output of the game sound on the terminal side. Therefore, when it is desired to maintain the state where the player gazes at the LCD 21 of the terminal device 6, it is possible to maintain the state.

Regarding the monitor game sound to be a target of the above-mentioned output delay, the entirety of the monitor game sound in the game may be delayed, or only part of the monitor game sound corresponding to a specific scene may be delayed. For example, regarding the above-mentioned voice sound for explaining the game content, when the voice sound common to all the players is output (that is, when the same voice sound is output from the monitor 2 side and the terminal device 6 side), the above-mentioned delay process is performed. When voice sounds of different contents are output from the monitor 2 side and the terminal device 6 side, respectively, the above-mentioned delay process may not be performed.

Further, in the exemplary embodiment, a case has been described where the series of processes of delaying and outputting the monitor game sound are executed on a single apparatus (the game apparatus body 5). However, in another exemplary embodiment, the series of processes may be executed in an information processing system including a plurality of information processing apparatuses. For example, in an information processing system which includes the game apparatus body 5 and a server-side apparatus communicable with the game apparatus body 5 via a network, part of the series of processes may be executed on the server-side apparatus. Further, in the information processing system, the system on the server side may be configured with a plurality of information processing apparatuses, and processes to be executed on the server side may be shared and performed by the plurality of information processing apparatuses.

What is claimed is:

1. A game system including a game apparatus, a first output device having a first display section and a first sound output section, and a second output device having a second display section and a second sound output section, wherein the game apparatus includes:

an image generation section configured to generate a first image to be displayed on the first display section, and a second image to be displayed on the second display section;

a sound generation section configured to generate, based on the same sound data, a first sound signal to be output to the first sound output section, and a second sound signal to be output to the second sound output section, and a sound signal transmission section configured to transmit the first sound signal to the first sound output section, and transmit the second sound signal to the second sound output section, wherein the sound signal transmission section transmits the first sound signal such that a timing to transmit the first sound signal to the first sound section is delayed by a predetermined time with respect to a timing to transmit the second sound signal to the second sound output section.

2. The game system according to claim 1, wherein the first output device is a monitor device which includes or is connectable to predetermined loudspeakers as the first sound section, and the second output device includes a housing which is small enough to be held by a player, and the second sound output section is integrated with the housing.

3. The game system according to claim 1, wherein the sound signal transmission section transmits the first sound signal such that the transmission timing of the first sound signal is delayed with respect to the transmission timing of the second sound signal, so that a player can recognize that the same sound based on the same sound data is output from each of the first sound output section and the second sound output section, and the player can comprehend the content of the output sound.

4. The game system according to claim 1, wherein the sound signal transmission section transmits the first sound signal to the first sound output section such that the transmission timing of the first sound signal is delayed by a value in a range from 20 ms to 100 ms with respect to the transmission timing of the second sound signal.

5. The game system according to claim 1, wherein the image generation section generates, as the first image, an image of a virtual space based on a first virtual camera, and generates, as the second image, an image of the virtual space based on a second virtual camera.

6. The game system according to claim 1, wherein the second output device further includes an operation data generation section configured to generate operation data based on an operation performed by a player, and the game apparatus further includes a game processing section configured to perform a game process based on the operation data.

7. A game apparatus capable of outputting a video/audio signal to a first output device having a first display section and a first sound output section, and to a second output device having a second display section and a second sound output section, the apparatus including:
   a processing system, comprising a processor, the processing system being configured to at least:
      generate a first image to be displayed on the first display section, and a second image to be displayed on the second display section;
      generate, based on the same sound data, a first sound signal to be output to the first sound output section, and a second sound signal to be output to the second sound output section, and
      transmit the first sound signal to the first sound output section, and transmit the second sound signal to the second sound output section, wherein
      the first sound signal is transmitted such that a timing to transmit the first sound signal to the first sound section is delayed by a predetermined time with respect to a timing to transmit the second sound signal to the second sound output section.

8. A non-transitory computer-readable storage medium having stored thereon a game program executed by a computer of a game system including a game apparatus, a first output device having a first display section and a first sound output section, and a second output device having a second display section and a second sound output section, the game program causing the computer to provide functionality comprising:
   an image generation to generate a first image to be displayed on the first display section, and a second image to be displayed on the second display section;
   a sound generation to generate, based on the same sound data, a first sound signal to be output to the first sound output section, and a second sound signal to be output to the second sound output section, and
   a sound signal transmission to transmit the first sound signal to the first sound output section, and transmit the second sound signal to the second sound output section, wherein
   the sound signal transmission section transmits the first sound signal such that a timing to transmit the first sound signal to the first sound section is delayed by a predetermined time with respect to a timing to transmit the second sound signal to the second sound output section.

9. A game processing control method of controlling a game system including a game apparatus, a first output device having a first display section and a first sound output section, and a second output device having a second display section and a second sound output section, the method comprising:
   generating a first image to be displayed on the first display section, and a second image to be displayed on the second display section;
   generating, based on the same sound data, a first sound signal to be output to the first sound output section, and a second sound signal to be output to the second sound output section, and
   transmitting the first sound signal to the first sound output section, and the second sound signal to the second sound output section, wherein
   in the sound signal transmitting, the first sound signal is transmitted such that a timing to transmit the first sound signal to the first sound section is delayed by a predetermined time with respect to a timing to transmit the second sound signal to the second sound output section.

\* \* \* \* \*